Oct. 20, 1936.  J. S. COLDWELL  2,058,134
PASTING MACHINE
Filed July 29, 1932  12 Sheets-Sheet 7
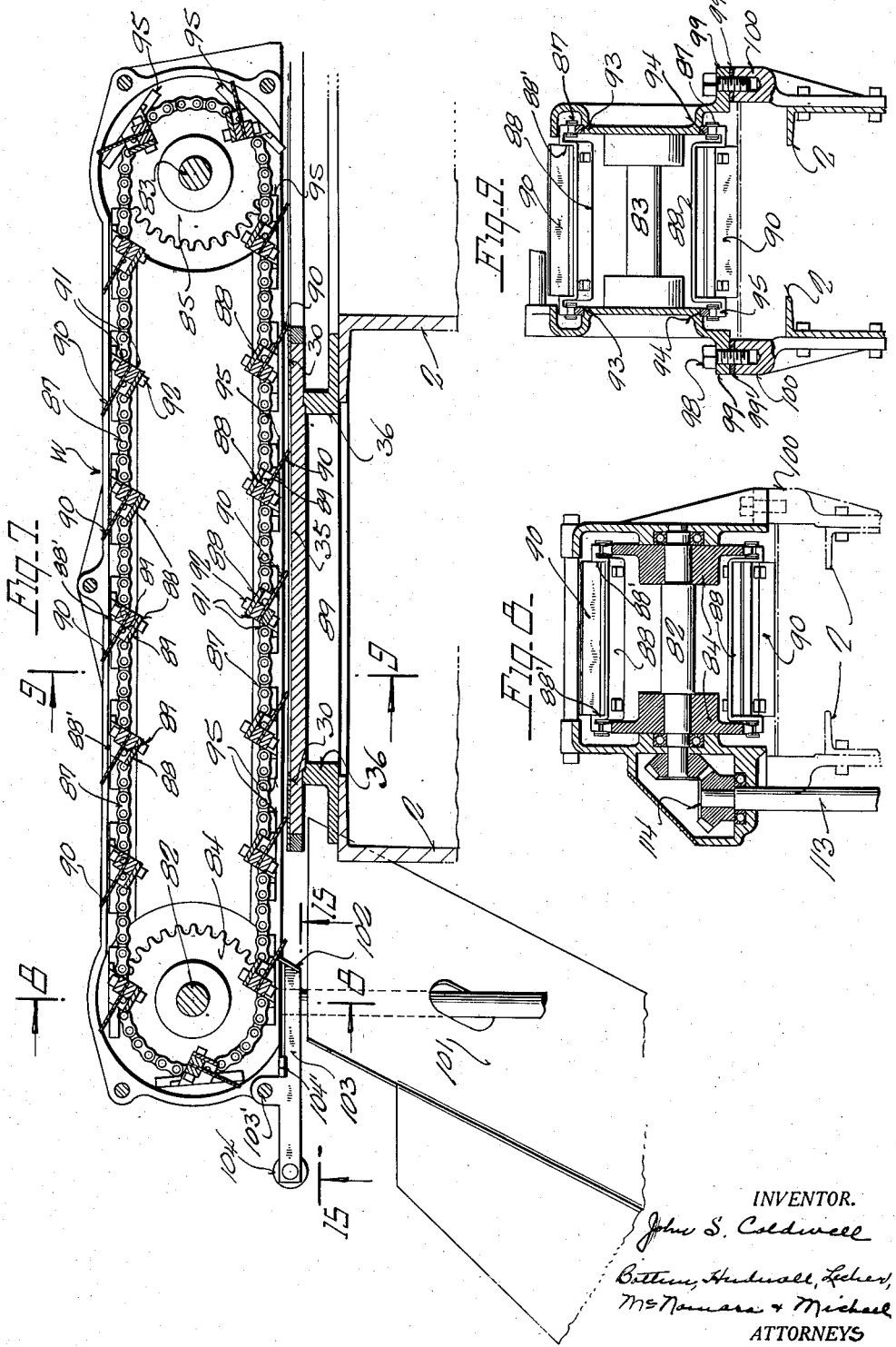
INVENTOR.
John S. Coldwell
ATTORNEYS Oct. 20, 1936. J. S. COLDWELL 2,058,134
PASTING MACHINE
Filed July 29, 1932 12 Sheets-Sheet 8
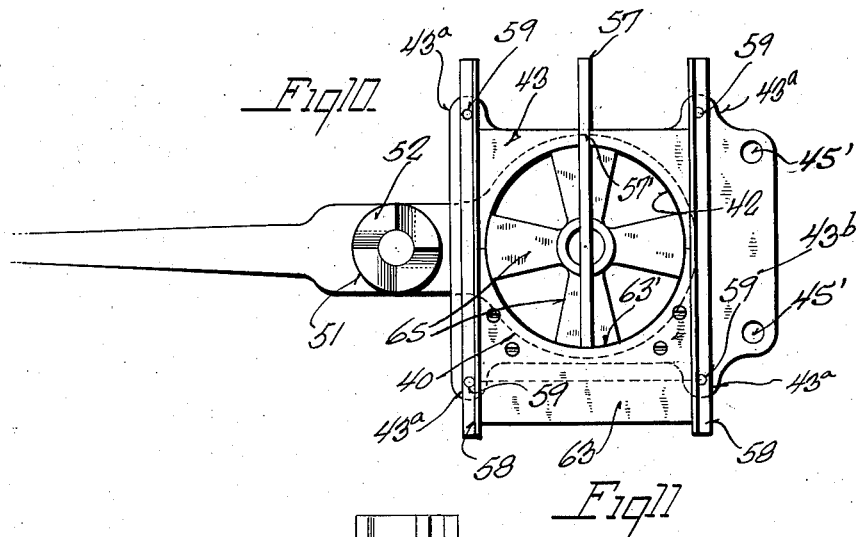
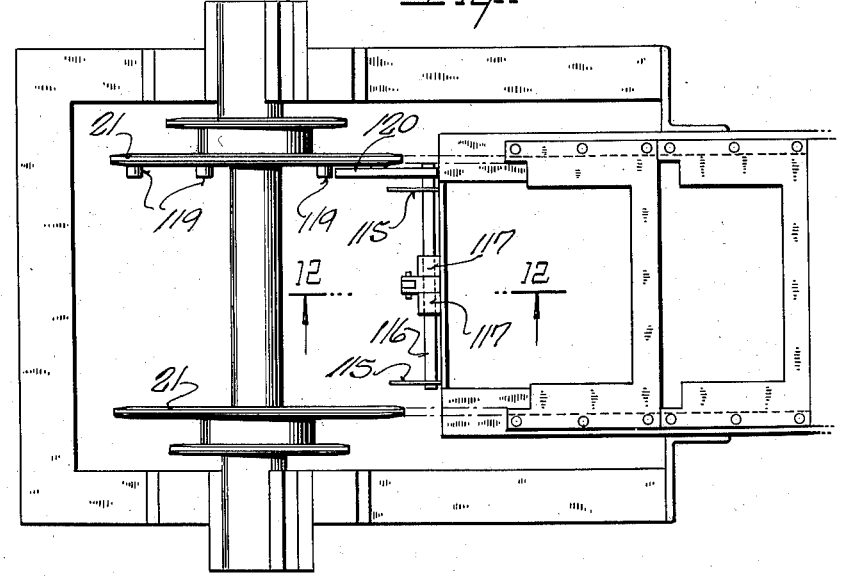
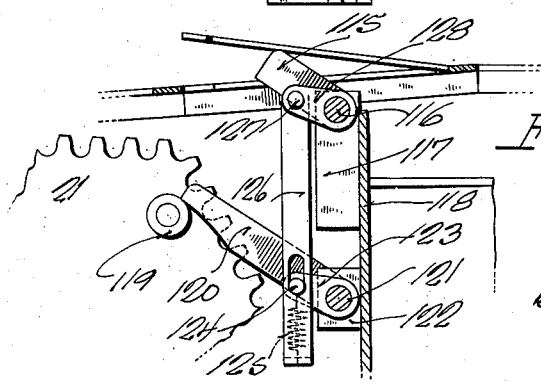
INVENTOR.
John S. Coldwell
BY
Bettens, Hudnull, Locher,
McNamara & Michael
ATTORNEYS Oct. 20, 1936.     J. S. COLDWELL     2,058,134
PASTING MACHINE
Filed July 29, 1932     12 Sheets-Sheet 9
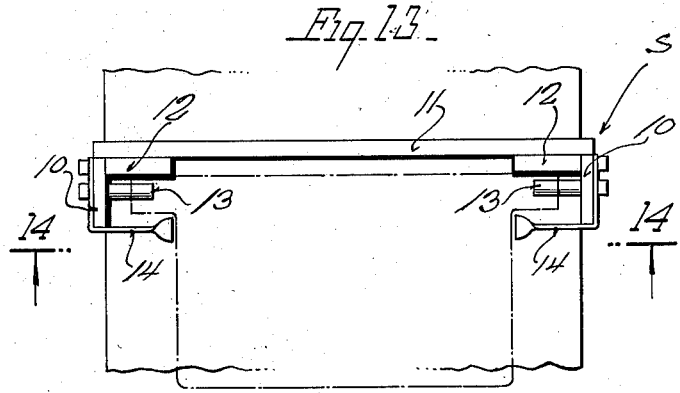
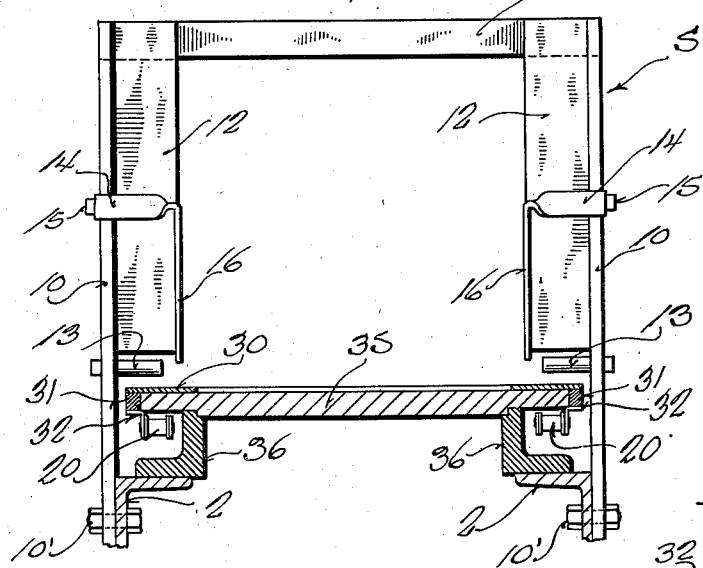
INVENTOR.
John S. Coldwell
BY
Bettern, Hudnell, Icher,
McNamara & Michael
ATTORNEYS Oct. 20, 1936. J. S. COLDWELL 2,058,134
PASTING MACHINE
Filed July 29, 1932 12 Sheets-Sheet 10
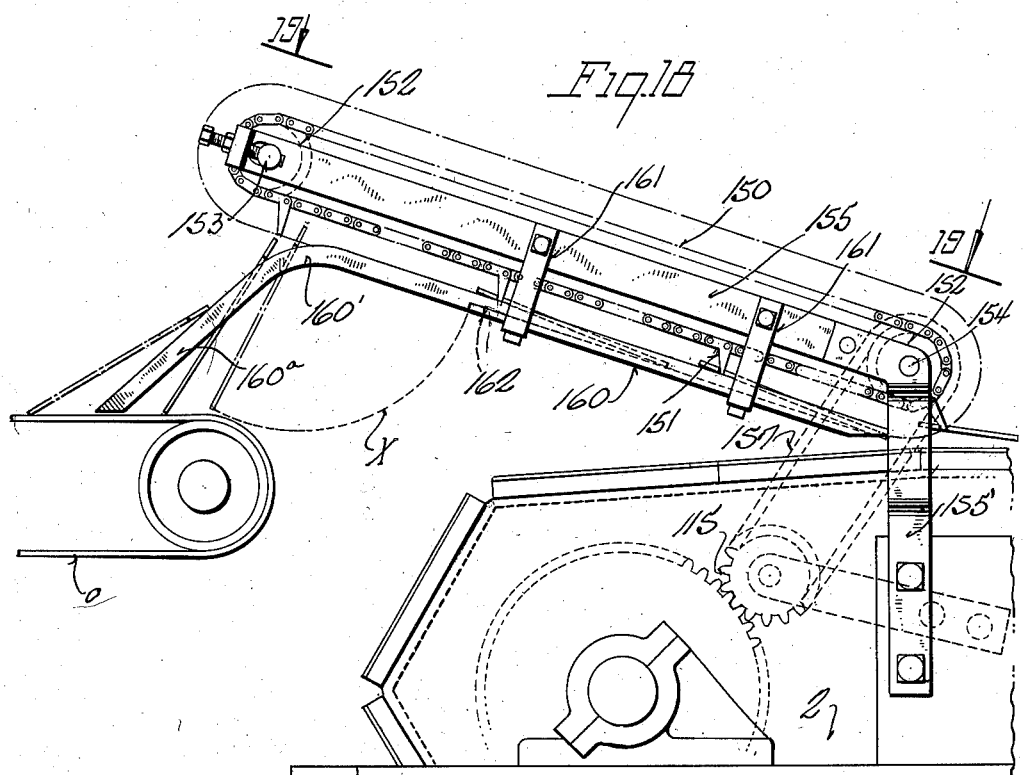
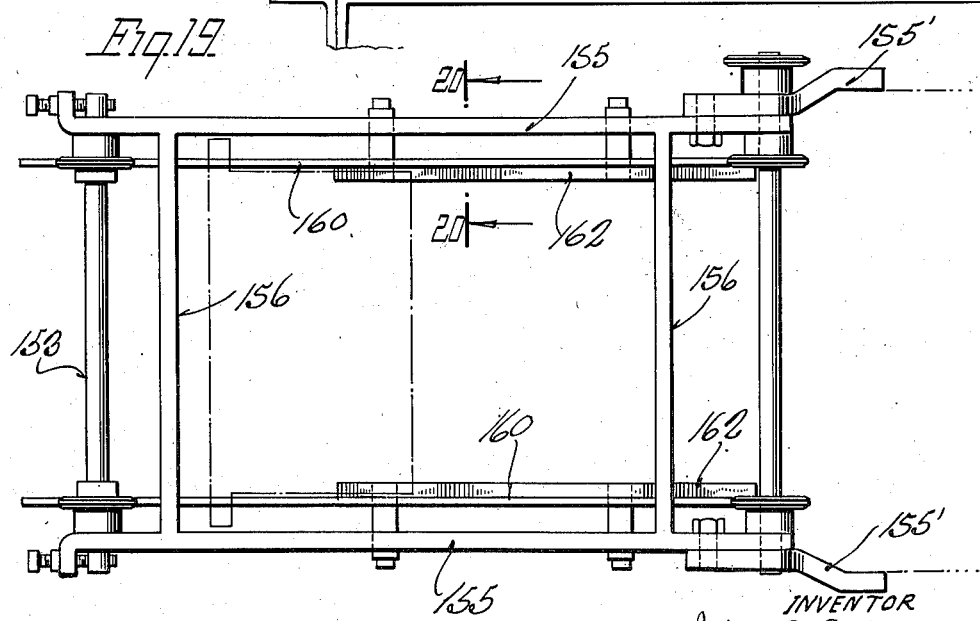
INVENTOR
BY John S. Coldwell
ATTORNEYS

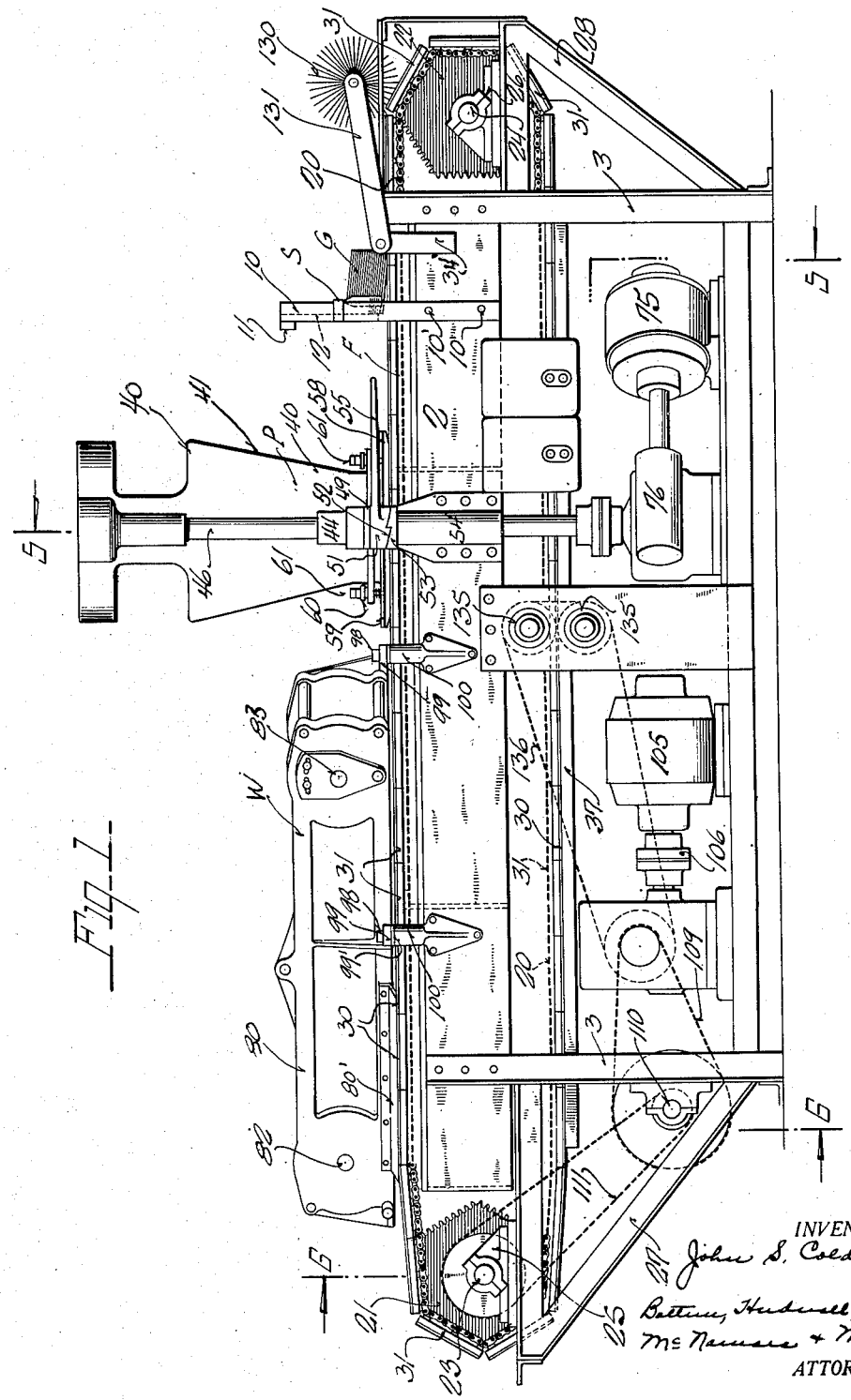

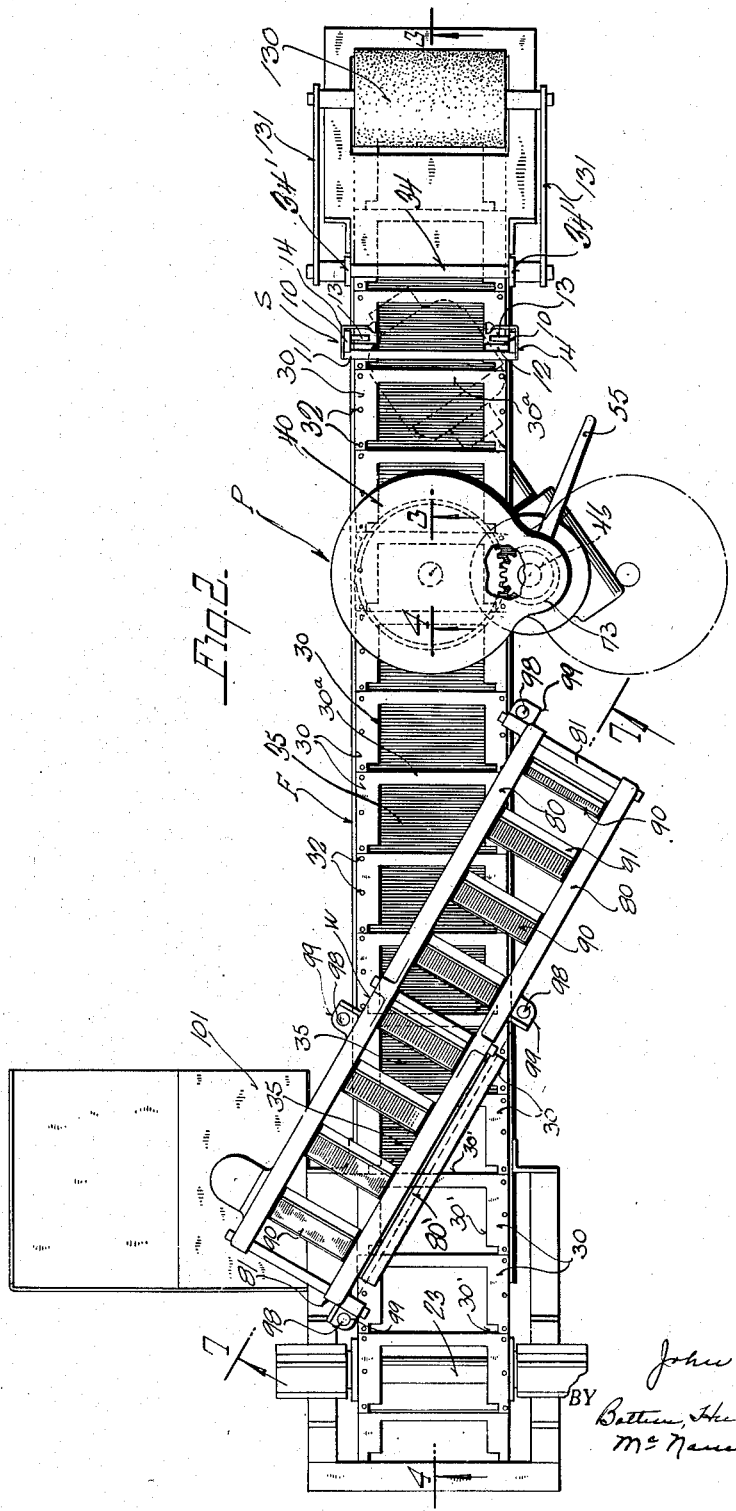

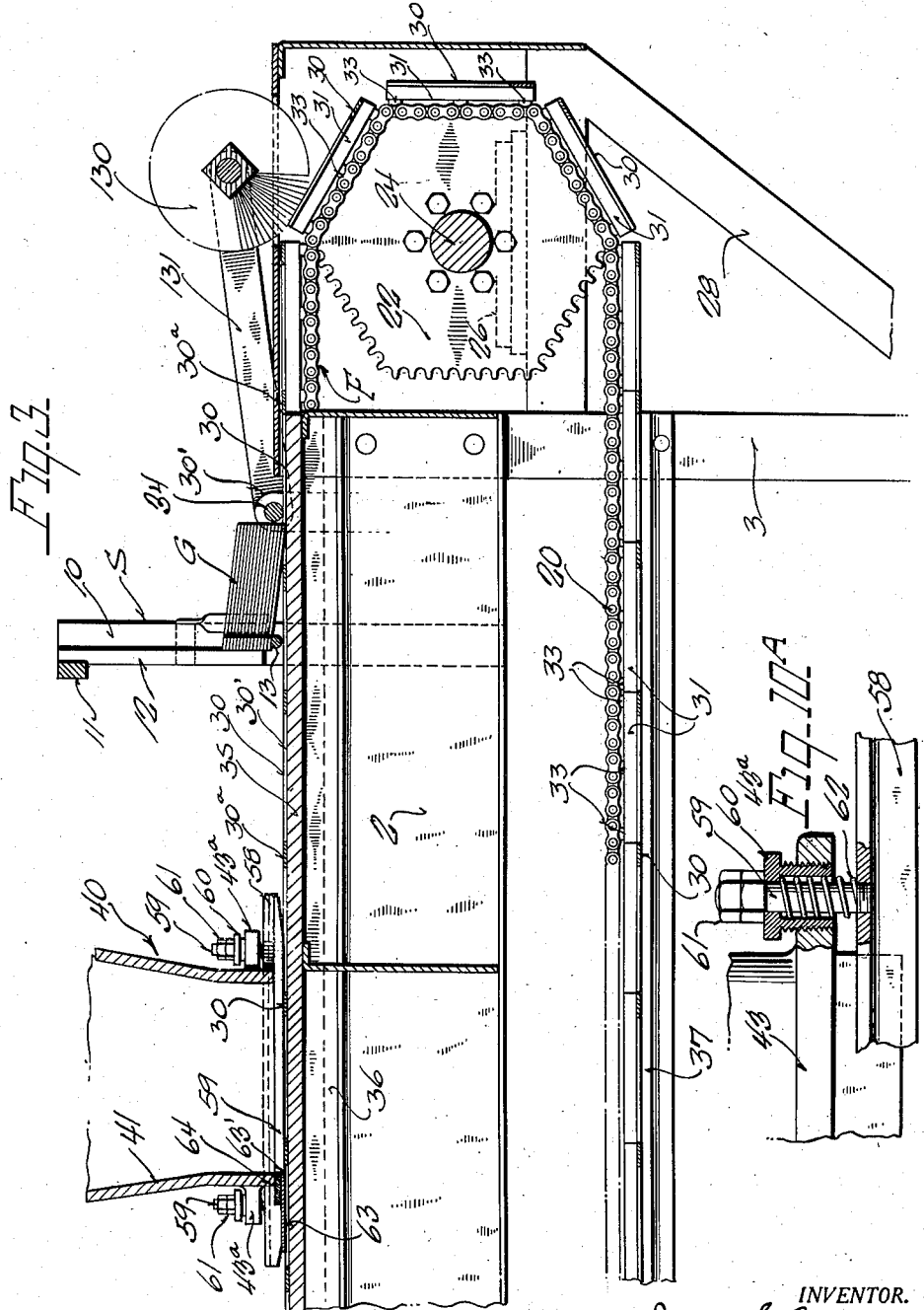

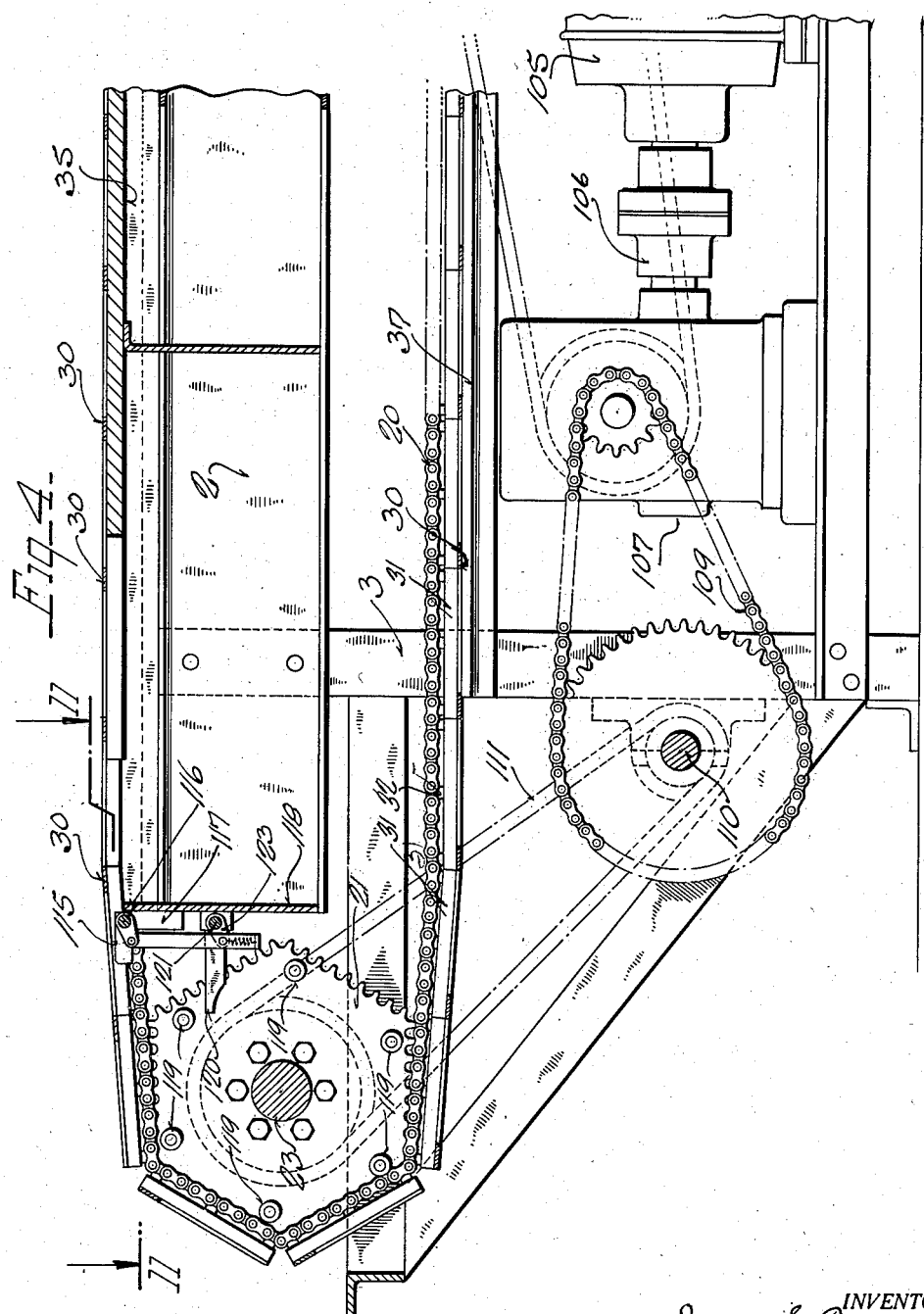

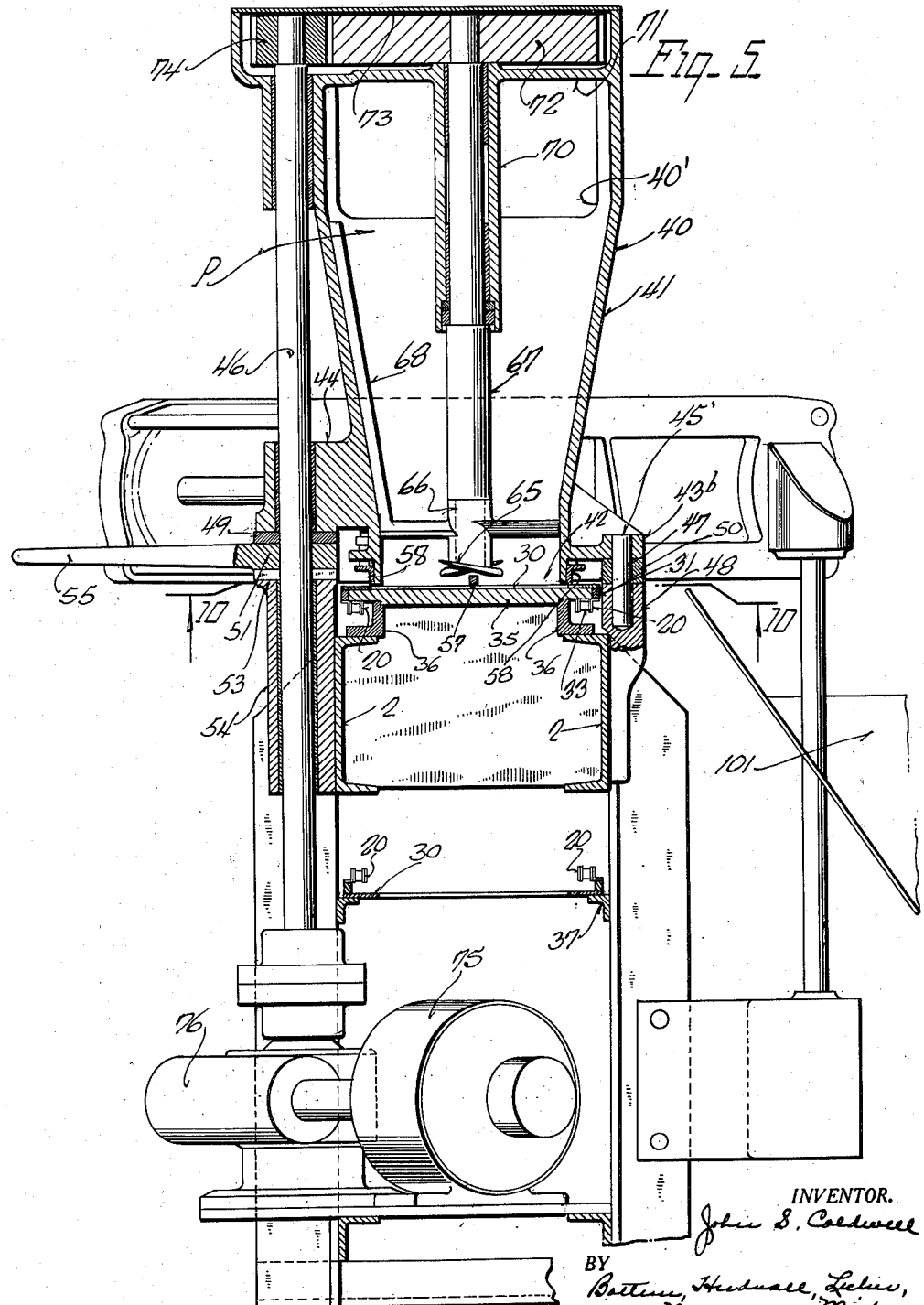

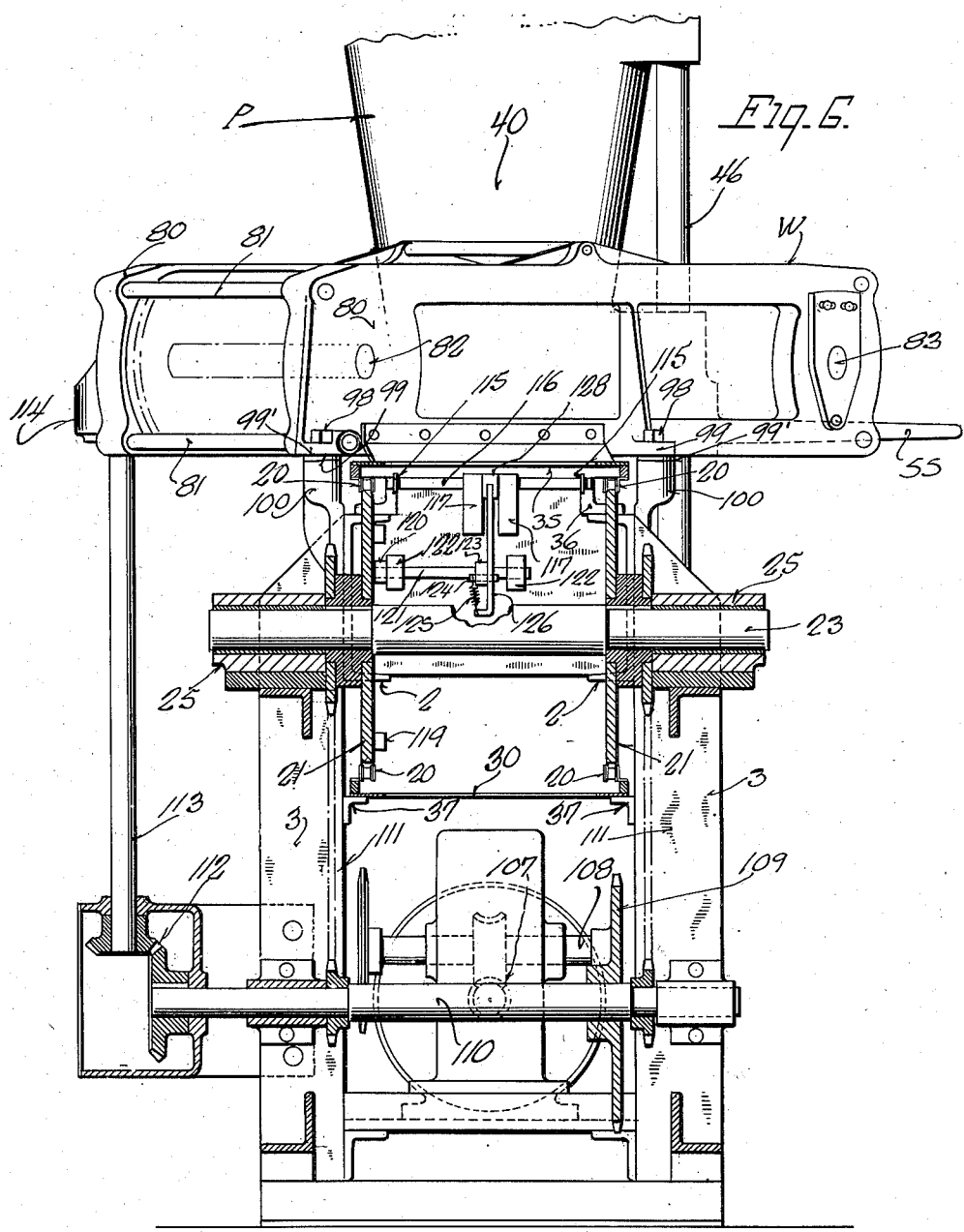

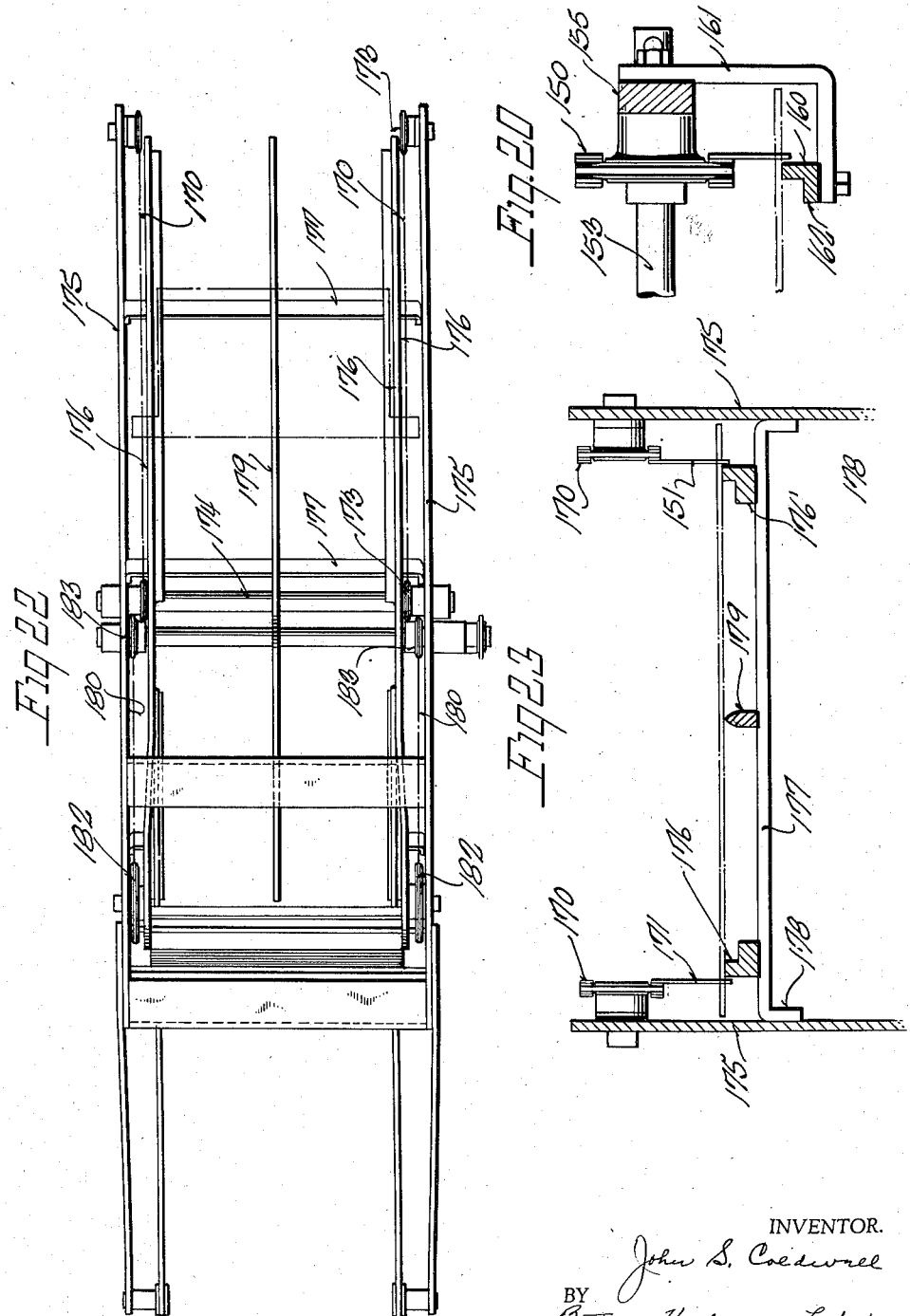

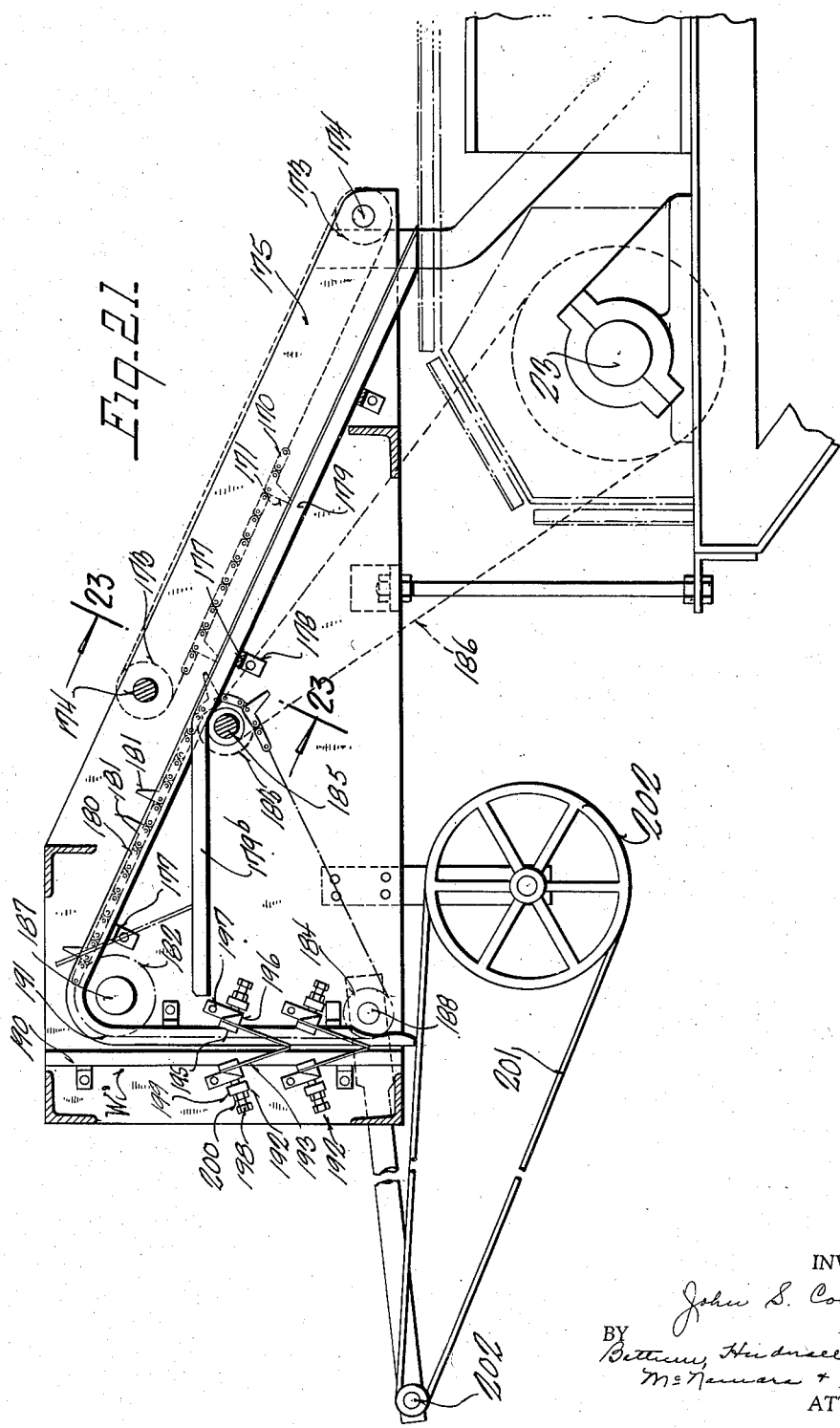

Patented Oct. 20, 1936

2,058,134

UNITED STATES PATENT OFFICE 2,058,134

PASTING MACHINE

John S. Coldwell, Milwaukee, Wis., assignor to Globe-Union Mfg. Co., Milwaukee, Wis., a corporation of Wisconsin Application July 29, 1932, Serial No. 625,952

11 Claims. (Cl. 226—39)

This invention relates to a machine for applying paste to grids to form storage battery plates.

In manufacturing plates for use in storage batteries, it has been the practice to cast grids in panel form with two grids in each panel. The grids are then pasted by hand, after which they are dried and then separated to form two complete battery plates. The present invention enables the pasting to be carried out automatically or by machine and, in general, the object of this invention is to provide a machine of this character which properly and automatically incorporates the paste in the structure of the grid, which avoids waste of paste, and which is effective, reliable and speedy in operation.

More particularly, the present invention provides a pasting machine wherein the grids in panel form are automatically taken one by one from a stack and carried to a novel form of paste applying means under the control of a feed conveyor which protects as well as conveys the grids after which the grids with paste applied thereto are subjected to the action of a very effective type of wiping means to force the paste into proper association with the strands or bars of the grids and into all of the spaces therebetween and to remove and carry off to an appropriate receiver any excess paste. In one form of the invention, the plates, after leaving the wiping means, are carried to the delivery end of the machine where they are ejected from the conveyor and transferred to the conveyor of a drying oven. Handling of the plates is avoided during the pasting operation. The novel characteristics of the stacking, feeding or conveying, paste applying, wiping, ejecting, and other instrumentalities, will be described more in detail hereinafter.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a view in side elevation showing a pasting machine embodying the present invention;

Figure 2 is a plan view thereof;

Figures 3 and 4 are fragmentary views taken on lines 3—3 and 4—4, respectively, of Figure 2, with parts shown in elevation and parts broken away for the sake of simplicity in illustration;

Figure 5 is a view in transverse vertical section taken on line 5—5 of Figure 1, looking in the direction of the arrows and illustrating the paste applying means;

Figure 6 is a similar view taken on line 6—6 of Figure 1 and looking in the direction of the arrows;

Figure 7 is a view in vertical section taken on line 7—7 of Figure 2, looking in the direction of the arrows and illustrating the wiping means;

Figures 8 and 9 are views in transverse vertical section taken on lines 8—8 and 9—9, respectively, of Figure 7, looking in the direction of the arrows and further illustrating the wiping means;

Figure 10 is a view in transverse section taken on line 10—10 of Figure 5 and looking in the direction of the arrows, and further illustrating the paste applying means;

Figure 10ª is a fragmentary detail view on an enlarged scale and illustrating partly in section and partly in elevation the adjustable spring mounting employed for the ribs of the holding shoe;

Figure 11 is a view in section taken on line 11—11 of Figure 4, looking in the direction of the arrows and showing the ejecting means for the pasted grids or panels;

Figure 12 is a detail sectional view taken on line 12—12 of Figure 11 and further showing the ejecting means;

Figure 13 is a fragmentary plan view showing means for forming the stack of grids and controlling the feed of the same;

Figure 14 is a view in transverse vertical section taken on line 14—14 of Figure 13 and looking in the direction of the arrows;

Figure 15 is a detail view in section taken on line 15—15 of Figure 7 and showing the cleaning scraper for the blades of the wiping means;

Figure 16 is a fragmentary detail sectional view on an enlarged scale taken in the plane of line 9—9 of Figure 7 and showing on an enlarged scale the endless chain of the conveyor and a portion of one of the cross yokes associated therewith;

Figure 17 is a similar view taken in the plane of line 6—6 of Figure 1, and showing on an enlarged scale one of the endless chains of the feed conveyor, a portion of one of the templet-like grid carriers or receivers and the associated structure;

Figure 18 is a fragmentary view in side elevation showing the discharge end of the machine equipped with transferring mechanism for taking the grids from the feed conveyor and transferring them to another conveyor, as, for example, the conveyor of a drying oven;

Figure 19 is a view in top plan of parts shown in Figure 18, as indicated by the arrows 19—19;

Figure 20 is a sectional view taken on line 20—20 of Figure 19;

Figure 21 is a fragmentary view partly in side elevation and partly in vertical section showing a modified form of wiping means;

Figure 22 is a view in top plan of the modification shown in Figure 21; and

Figure 23 is a sectional view taken on line 23—23 of Figure 21.

General construction

Referring to the drawings, it will be seen that the machine comprises a main frame consisting of side members 2 suitably cross connected and supported on legs 3, the legs being appropriately connected to provide a strong and rigid main frame structure. In general, the component instrumentalities of the machine that are organized with this main frame structure consist of a stack forming and feed controlling means designated generally at S, paste applying means indicated generally at P, means designated generally at W for wiping the paste into the grids, removing the excess paste and smoothing the surfaces of the storage battery plates, a feed or conveyor mechanism designated generally at F for carrying the grids from the stack S through the paste applying means P and through the wiping means W to the delivery end of the machine. In addition to these main groups of instrumentalities, means is provided for ejecting the pasted panels or grids from the conveyor at the delivery end of the machine, for transferring the ejected pasted panels or grids from the machine to a conveyor, as, for example, an oven conveyor, and for actuating and cleaning the various elements, etc., as will hereinafter be more fully described.

As shown in Figure 1, a supply of panels hereinafter termed grids and designated at G are provided in the stack S.

Stack forming and feed controlling means

The means for forming the stack and controlling of the feed of the grids therefrom is shown to advantage in Figures 1, 2, 3, 13, and 14, and, as illustrated, comprises a pair of upright side bars 10, the lower ends of which are fastened as at 10' to the frame members 2 and the upper ends of which are connected by a cross strip 11. Plates 12 secured to the uprights 10 and cross strip 11 form the front structure of the stack forming means, that is, the structure against which portions of the forward edges of the lugs of the grids G abut. The stack of grids is supported in a slightly inclined position by means of supporting pins 13 carried by the uprights 10 and projecting inwardly beyond the uprights just below the lower ends of the front plates 12. The distance between the top edges of the pins 13 and the bottom edges of the plates 12 is sufficient to admit of the free passage of only one grid G at a time. The stack of grids is held against rearward movement or slipping by means of back pieces 14 constructed of metal straps having portions secured as at 15 to the uprights 10 and having vertical portions 16 engaging the rearward edges of the laterally projecting ears or lugs of the grids. The operation of this structure may best be understood in conjunction with the operation of the means for feeding or conveying the grids through the machine, which means will now be described.

Feeding or conveying mechanism

The feeding or conveying mechanism comprises two endless sprocket chains 20 having upper and lower runs extending the full length of the machine and paralleling each other, although transversely spaced. As shown in Figures 1, 3, 4 and 6, the sprocket chains 20 are trained about a pair of hexagonal drive sprockets 21 fixed on a drive shaft 23 and about a pair of similar idler sprockets 22, mounted on an idler shaft 24. The shafts 23 and 24 are rotatably supported in bearings 25 and 26, provided therefor on extensions 27 and 28 of the main frame.

The sprocket chains 20 carry an endless series of templet-like grid receivers or carriers 30, the grid carriers 30 being in abutting relation longitudinally of, extending transversely between, and connected along their side edges, to the chains 20 by means of connecting strips 31 riveted as at 32 to the grid receivers and to connecting brackets 33 which are also interconnected with the pivots 20' between the links of the chains 20 as clearly shown in detail in Figure 17.

The upper runs of the conveyor chains 20 together with their grid carriers travel for a substantial portion of their extent along a top or table 35 supported by angle irons 36 on the side members 2 of the main frame. The angle irons 36 are set in from the side edges of the table or top 35 to afford clearance for the sprocket chains 20 (see Figures 5, 6 and 14). Since the sprocket chains engage under the edge portions of the top or table 35, the grid carriers 30 are held down against the upper surface of the table during their travel therealong. Furthermore, the strips 31 engage the edges of the table or top 35 to properly center or position the grid carriers 30 on the table and in respect to the various instrumentalities of the machine. The lower runs of the chains together with their grid carriers are supported and held against sagging by angle bars 37 which provide tracks along which the receivers slide. It will be understood that with the feeding mechanism or conveyor actuated to cause the upper runs of the chains 20 to move from the right to the left as viewed in Figures 1 and 3, the grid carriers 30 will successively engage the lowermost grid G of the stack in the stack forming means S. To insure each grid carrier engaging the lowermost grid only of the stack a holddown bar or shaft 34 located just to the rear of the stack of grids presses each grid carrier 30 snugly against the table 35 as the grid carrier moves under the stack. The bar or shaft 34 is mounted in brackets 34' secured to the side members 2 of the main frame. As clearly illustrated in Figure 3, the lowermost grid G drops into the opening 30' of the grid carrier 30 brought under the stack of grids, so that the rearward edge of this lowermost grid of the stack rests on the table top 35 until the cross bar 30ᵃ of the grid carrier comes into engagement with the rearward edge of such grid, whereupon the motion of the carrier pushes the lowermost grid forwardly until its ears or lugs slide off of the pins 13 at which time such grid drops into the opening 30' which conforms in contour with the grid. There is but a very slight sliding movement or engagement between the lowermost grid of the stack and the next to the lowermost grid before the lowermost grid drops and is entirely disengaged from the next to the lowermost grid. This precludes wear and tear on the grids. Once within the control of the grid carriers the grids are completely housed and protected except that their upper surfaces are exposed. The carriers 30 also keep the edges of the panels or grids clean.

Paste applying means

As shown to advantage in Figures 1, 2, 5 and 10, the paste applying means comprises a hopper designated generally at 40 and having a downwardly tapering portion 41 of circular cross section. The lower portion of the hopper has a circular discharge opening 42 slightly above which is an integral outwardly directed flange 43 formed at the corners with lugs 43ª and at one side with a braced extension or enlargement 43ᵇ (see Figure 10). A supporting lug 44 is formed integral with the lower portion of the hopper at one side thereof and has a vertical opening in which the shaft 46 is fitted whereby this shaft 46 serves not only as a guide or alining means but also as an axis of swing for the hopper as well as a motion transmission element, as will be hereinafter more fully described. The flange extension 43ᵇ is provided with spaced vertical openings 45' which fit over centering and securing pins 47 projecting upwardly from brackets 48 secured to one of the frame members 2 of the main frame. The desired vertical adjustment of the hopper is obtained by means of spacing washers or collars designated at 49 and 50 and provided on the shaft 46 and pins 47, respectively. The collars 50 are interposed between the brackets 48 and the flange extension 43ª. The washer 49 is interposed between the underside of the lug 44 and the smooth and plane top of a cam 51. The cam 51 is provided on its undersurface with inclined or cam surfaces 52 which coact with correspondingly formed surfaces 53 provided on the upper end of a bearing 54 secured to one of the side members 2 and in which the shaft 46 is journaled. A handle 55 may be integrally formed with the cam 51. When the inclined or cam surfaces 52 of the cam nest with the correspondingly formed surfaces 53 in the upper end of the bearing 54 then the weight of the hopper causes it to assume and retain its lowermost position, in which position the washer 49 and collars 50 properly relate or dispose the discharge end of the hopper with respect to the table 35 and to the grids being carried along the table. By varying the size of the washer 49 and collar 50 or using a plurality of these or using shims in addition thereto, vertical adjustment of the hopper is effected and the amount of surplus paste left on the panels or grids is regulated. When the handle 55 is swung to cause the cam surfaces 52 to ride up the cam surfaces 53, then the hopper 40 is elevated and the flange extension 43ᵇ is disengaged from the pins 47 so that the hopper may be swung around the shaft 46 to one side of the machine to provide for access to or inspection of the paste applying means and for cleaning out the hopper.

It is to be understood that when the hopper is in operative position sufficient clearance is provided between its lower end and the grids and their carriers to permit the grids and carriers to pass freely past the hopper and also to permit the desired excess of paste to be carried along with the grids.

For the purpose of holding the grid carriers and the grids in proper position on the table 35 during the time that the paste is being forced into the grid, a holding shoe designated at 56 is provided and consists of a central longitudinal presser rib 57 in the form of a flat strip and a longitudinal presser rib 58 along each side. The center rib 57 is fixed in position, being suitably secured, as by a screw 57' to the flange 43. The side ribs 58 are in the form of angles and have similar adjustable spring mountings. As illustrated in Figures 3, 5, 10 and 10ª each presser rib 58 is supported by two studs 59, one near each end thereof, each stud 59 having its lower end threadedly connected to its rib and having its upper end portion slidable through a flanged bushing 60. Above the bushing, nuts 61 are threaded on each stud 59 and limit the downward movement of the studs and consequently of the presser ribs 58. Coil springs 62 are interposed between the bushings 60 and the ribs 58 and hold the ribs down with a yielding action. The bushings 60 are threaded into openings in the lugs 43ª of the hopper flange 43 and by adjusting the bushings or the nuts 61 or both, the position of the ribs 58 may be varied and controlled. To prevent the paste from rolling up under the edge of the hopper, a take-off plate 63 is provided at the departing end of the hopper, that is, at the end or side thereof from which the receivers and grids emerge after the paste has been pressed into the spaces of the grids. This plate 63 may be constructed of thin spring steel and adjacent the hopper has superposed thereon a reinforcing strip 64. The take-off plate presents a sharp inner end 63' which functions to cut-off the paste from the grids as they pass from the hopper. It also has the function of smoothing down the paste and packing the same well in the grid.

As shown in Figure 5, the mechanism for forcing the paste from the hopper down into the grids comprises a four-blade screw or propeller 65 having its hub 66 secured to the lower end of a shaft 67. A scraper blade 68 is formed integral with one of the blades of the screw and extends upwardly adjacent the inner surface or periphery of the hopper. The shaft 67 is journaled for rotation in a bearing 70 which may be cast integral with the hopper and which has a gear casing 71 integral with the upper end thereof. A large gear wheel 72 is fixed to the upper end of the shaft 67 and is received within the gear casing 71. A cover plate 73 is provided for the gear casing. Below the cover plate the hopper has an inlet opening 40'. The gear 72 is driven by means of a pinion 74 splined on the upper end of the shaft 46 and meshing with this gear 72. For driving the shaft 46, a suitable motor such as an electric motor 75 may be provided and appropriately geared as at 76 to the lower end of the shaft 46. When the motor 75 is running, the shaft 46 is turned and acts through the gears 74, 72 to turn the shaft 67 and consequently also the four-blade propeller 65 and scrapers 68.

This results in the paste being forced into the spaces or meshes of the grid evenly and effectively. The four-blade screw or propeller gives the maximum pressure on the paste with a minimum loss of space due to the hub area.

The pinion 74 being splined on shaft 46 moves with the hopper up along this shaft when the hopper is elevated and when the hopper is swung to one side of the machine, the gear 72 rolls around its pinion 74.

Wiping mechanism

After the paste has been forced into the grids and the grids and their receivers progress along the table 35 beyond the hopper 40 they come under the action of the wiping mechanism W which wipes the paste into the spaces between the strands or bars of the grid, properly compacts the same therein, removes any excess of paste and smooths one surface of the plates. As illustrated to advantage in Figures 2 and 6, the wiping mechanism comprises a pair of side frame members 80 held in properly spaced relation by means of cross members 81 and extending across and above the path of movement of the grids at an angle.

Referring to Figures 7, 8 and 9, it will be seen that shafts 82 and 83 are journaled in the end portions of the frame and carry pairs of sprocket wheels designated at 84 and 85 over which sprocket chains 87 are trained. The members of each pair of sprocket wheels are transversely spaced from each other and are longitudinally alined with the members of the other pair. At regularly spaced intervals along the chains are transversely extending yokes 88, the ends of which are angled as at 88' into parallelism with the chain and secured thereto by the pairs of link pins 89, the pairs of link pins utilized for effecting this connection between the chains and the yokes being elongated sufficiently to enable them to accomplish their purposes (see Figure 16). Wipers or trowels 90 are clamped to the yokes 88 by clamping strips 91 and fasteners 92. In order to hold the wipers in proper angular or wiping operation, trackways or guides 93 and 94 are formed in the side frame members 80 (see Figure 9). The runs of the chains 87 directly engage the tracks 93 and 94 and are constrained to movement in a straight and predetermined path and this effect is translated into the holding of the wipers in proper angular position by virtue of the provision of holding strips 95 welded to the ends of the extensions of the yokes and bearing against the links of the chains. Consequently, the wipers 90 are disposed for efficient wiping during their action on the pasted grids or panels.

The wiper assembly is disposed diagonally to or at an angle across the main frame and across the path of travel of the grids as will be understood from Figure 2 and is supported in this position by means of bolts 98 which coact with apertured lugs 99 provided on the frame members 80 and are threaded into brackets 100 provided on the side frame members 2 of the main frame. Spacers or shims 99' are interposed between the lugs 99 and brackets 100 to obtain the proper vertical adjustment of the wiper assembly. By having the wiping mechanism disposed at an angle, the wiping action is enhanced and the excess material is removed and thrown into a receiver 101. The tendency to create a suction or vacuum between the table and the pasted panels, when the panels leave the end of the table is avoided by having the end of the table 35 beveled or angled as at 35' (see Figure 2). The diagonal end of the table 35 is parallel and as close as possible to the departing line of the wiper travel so that the wiper holds the pasted grids down on the table as well as wipes them throughout practically their entire travel along the table after leaving the pasting means. This counteracts the tendency of the plates to lift and leave the paste adhering to the table. In other words, as the grids leave the angular end of the table there is not the sucking action on the square pellets, which there would be were the end of the table straight across. By having the angle of the end of the table parallel to the line of action of the wipers and close thereto there is very little table for the grids to slide over after they come out from under the pressure of the wipers.

It is to be noted that the wipers effective to exert a wiping action travel in the same general direction as the grids are traveling, as this tends to promote a smooth wiping action and to preclude the wipers pulling paste out of the grids. Under these circumstances, however, the wiping action is effected by having the wipers move at a somewhat greater speed than the speed of movement of the grids. By having the wipers move in the same direction and at a greater speed than the grids any pulling effect due to the movement of the pasted grid over the table, is offset and the paste is packed forwardly into the back of the cross bars or cross wires of the grid structure.

As shown in Figures 7 and 8, the chains 87 are located outside the wipers 90 so that any paste falling through the wiping means will not accumulate on the chains.

Following the completion of a wiping operation by each wiper, the wiper is scraped or cleaned of any paste that may adhere thereto. As shown in Figures 7 and 15, this is accomplished by means of a scraper 102 secured to one end of a frame 103 pivoted as at 103' to the side frame members of the wiping mechanism and biased to yielding engagement with the blades by means of a weight 104. Stop lugs 104' on the frame 103 are engageable with the frames 80 to limit the movement of the scraper 102 toward the wiper.

A stationary wiper in the form of a flexible rubber strip 80' is secured to one of the side frame members 80 of the wiping mechanism and has smoothing engagement with the plates as they leave the wiping mechanism and just before they pass off the end of the table 35 to take out any slight ripples left by the wiping mechanism.

*Driving mechanism for the feed conveyors and wiping mechanism*

As shown in Figures 1, 4 and 6, the drive for the feed conveyor chains 20 is taken from an electric motor 105 and carried back through a coupling 106 to worm gearing 107. The driven shaft of this worm gearing designated at 108 is connected by chain and sprocket gearing 109 to a cross shaft 110, which connects by chains and sprockets 111 to the drive shaft 23. The cross shaft 110 also connects through bevel gearing 112 (see Figure 6) with an upright shaft 113 which in turn is connected by bevel gearing 114 (see Figures 6 and 9) to the drive shaft 82 of the wiping mechanism. The desirable gear ratios are preserved to insure the proper differential between the drive of the wipers and the drive of the chains 20 which actuate the carriers for the grids and control the motion of the grids through the machine.

*Plate ejecting mechanism*

As the plates, that is, the grids which have been pasted, leave the wiping mechanism they are carried immediately to the delivery end of the machine where they are displaced from the carriers of the feed conveyor automatically by ejecting or delivering mechanism shown to advantage in Figures 4, 6, 11 and 12. This mechanism consists of a pair of ejecting fingers 115, fixed on a rock shaft 116, journaled in bearings 117 provided therefor on a cross plate 118 of the main frame. The rock shaft 116 is oscillated in timed relation to the movement of the feed conveyor by providing rollers 119 on one of the drive sprockets 21, which rollers project laterally and inwardly from their drive sprocket and engage an operating lever 120 fixed to a shaft 121 journaled in bearings 122 provided therefor on the main frame. The shaft 121 has a crank arm 123 provided with a pin 124 loosely fitted in a slot in and connected by a spring 125 with a connecting link 126, the latter being pivotally connected as at 127 to a crank arm 128 fixed to the rock shaft 116.

With this structure, whenever a pasted plate or a carrier of the feed conveyor comes to the delivery end of the machine, one of the rollers 119 coacts with the operating lever 120 to rock the shaft 121 and consequently also the shaft 116 so as to swing the fingers 115 upwardly and cause them to engage and displace a plate if any is contained in the carrier of the feed conveyor at the delivery end of the machine. Spring 125 precludes injury or damage in the event of a grid jamming or if the parts stick for other reasons.

Transferring mechanism

Means may be provided for picking up the grids or plates as they are lifted by the ejecting mechanism and transferring them to a conveyor O, which may be the conveyor of a drying oven. As shown in Figures 18, 19 and 20, this transferring means may comprise a pair of endless conveyors 150, preferably in the form of sprocket chains and having grid engaging lugs 151 at spaced intervals therealong. The sprocket chains are mounted on sprockets 152 provided in pairs and fixed to shafts 153 and 154. These shafts 153 and 154 are supported for rotation in the side members 155 of a frame, the frame members 155 being cross connected by cross members 156. The side members 155 of the frame are rigidly supported in an inclined position by virtue of the fact that their lower ends are rigidly secured to supporting brackets 155' fastened to and extending upwardly from the side members 2 of the main frame. Chain and sprocket gearing designated generally at 157 and spur gearing 158 is utilized to drive the shaft 154 from the shaft 23. Longitudinally guides are provided and extend below and for the major part of their length parallel to the lower run of each of the chains 150, these guides being held in position by means of supporting straps 161 fastened thereto and to the side frame members 155. At one end the guides 160 are in close proximity to the position to which the ejecting mechanism lifts the plates or guides, the arrangement being such that the ears of the plates or guides are lifted into engagement with the lugs 151 which pull the ears of the plates or grids up onto the top edges of the vertical flanges of the guides 160 and thereafter pull the grids longitudinally along the guides. As the grids are pulled up along the guides, the side edges of their lower corners slide along inturned supporting flanges 162 formed integral with the vertical portions of the guides 160. These inturned flanges 162 terminate short of the upper portion of the guides so that when the grids or panels are properly located relative to the conveyor O they swing downwardly as indicated by the dotted line x in Figure 18, about their ears as an axis. This swinging movement brings the lower edge of the panel or grid into a position where it is engaged by the upper run of the conveyor O. The lower corners of the grids or panels are disengaged from the supporting flanges 162 when the ears of each grid or panel reach the downwardly curving portion 160' of the guides so that the lower end of the grid or panel sweeps past and slightly up from the upper run of the conveyor O. Now, as the grid or panel is sliding down the curved portion 160' and is disengaged from the lugs 151 which previously have been propelling it it rests on the upper run of the conveyor in the inclined position shown in full lines in Figure 18 and thereafter is carried down the inclined portions 160ª of the guides by the dragging effect which the upper run of the conveyor belt exerts on its lower end.

Cleaning mechanism

For removing any particles of paste that may tend to adhere to the carriers of the feed conveyor, suitable brushing means is provided. For example, a rotary brush 130 may be supported for rotation on swingable arms 131, the arms being pivotally mounted on the bracket 34'. The swinging mounting of the brush enables it to rise and fall to conform to the corresponding motion of the carrier of the endless conveyor, as the latter moves around the hexagonal idler sprockets 22. In addition to this brushing mechanism or in lieu thereof, a pair of rotary brushes 135 may be provided to operate on the return run of the endless feed conveyor (see Figure 1), the brushes 135 being above and below the return run and being positively driven from the shaft 108 by means of chain and sprocket gearing designated generally at 136.

Supplemental wiping mechanism

Transferring means broadly similar to that just described may be combined with supplemental wiping mechanism and is illustrated in Figures 21, 22 and 23. As illustrated, transferring means is provided and includes a pair of endless sprocket chains 170 provided with grid engaging lugs 171 and trained about sprocket wheels 173 mounted on shafts 174 rotatably supported in side frame members 175. The sprocket chains are transversely spaced and disposed above guide rails 176 along which the grids or panels are pushed. There are two such guide rails and they extend from the proximity of the ejecting mechanism upwardly at an angle to the wiping mechanism designated generally at W'. The guide rails rest upon and are secured to strips 177 which extend transversely between the side members or plates of the frame and have their ends bent at an angle as indicated at 178 and riveted or otherwise suitably secured to the side plates. Positioned in between the guide rails 176 is a grid supporting rail 179. The rail 179 is also supported by the strips 177 and has a portion 179ª extending parallel to the guide rails 176 and a portion 179ᵇ which is bent downwardly to a horizontal position. It will be noted from Figure 21 that the sprocket chains 170 extend only part way up the guide rails. Beyond the sprocket chains 170 another pair of similar sprocket chains 180 is provided. These sprocket chains 180 are also equipped with grid engaging lugs 181 and function in exactly the same manner as the sprocket chains 170 except that they are trained about three sets of sprocket wheels designated at 182, 183 and 184, these sets of sprocket wheels being arranged to cause the chains to travel in a substantially triangular path with one leg of the triangle vertical and extending down through the wiping mechanism. The sprocket wheels 183 are fixed to a drive shaft 185 which is itself driven by chain and sprocket gearing 186 from the shaft 23 of the machine. The other sets of sprocket wheels 182 and 184 are mounted on freely rotatable shafts 187 and 188. During the time that the grids are being pushed up along the guides 176 by the lugs 171 of the sprocket chains 170 their ears ride on the top edges of the vertical portions of the guides 176 and their lower corners slide along the horizontal flanges 176' of these guides. The flanges 176' terminate adjacent the shaft 174, that is, adjacent the point where the grids are taken from the lugs 171 and pushed on up the guide rails by the lugs 181 of the sprocket chains 180. After the lower corners of each grid ride off the horizontal flanges 176' the lower portion of the grid rides along the horizontal portion 179$^b$ of the supporting rail 179 and the grid gradually swings around to a vertical position, which position it assumes as it rides off of the horizontal portion 179$^b$ of the supporting rail 179. When the grid is vertically positioned it starts its downward travel through the wiping mechanism with its ears or lugs traveling between vertical guide rails 190 and 191, the guide rail 191 being a continuation of and, if desired, integral with the inclined guides 176. The wiping means proper consists of a number of pairs of wipers designated generally at 192 and each consisting of a pair of flat wiping plates 193 constructed of thin and resilient sheet metal. The members of each pair of plates are arranged in a sort of a V formation, each plate angling inwardly and downwardly and the lower edges of the plates abutting or in cross relation to and in transverse alinement with the center line of the guide groove formed between the guides 190 and 191. The upper edge of each wiping plate is secured between clamping strips 195 and 196. Each clamping strip 196 is secured at its ends to arms 197 which are pivotally supported on the side frame members 175. The plates are adjusted toward or away from each other by means of screws or studs 198 threaded through lugs 199 suitably secured to the frame members 175 and bearing against the rear faces of the arms 197. By adjusting the screws 198 the arms 197 are swung about their pivotal mountings and the plates correspondingly adjusted. Lock nuts 200 may be provided for maintaining the adjustment of the studs or screws. It will be noted that the lugs 181 on the sprocket chains 180 are provided in pairs and thus have complete control over the grids or panels. The rearward lugs push the grid or panel down through the wipers and the forward lugs control the descent of the panels as they round the curving part of the guide-ways and pass down to the first set of wipers. After passing through both sets of wipers, the ears of the grids are deposited on a pair of endless flexible conveying elements designated at 201 which are trained about suitable pulleys 202 and 203 and carry the pasted grids out of the machine and to a point where they may be conveniently transferred to the oven conveyor. If desired, they may be directly deposited on the oven conveyor.

Operation

In operation, as the feed conveyor is driven, its upper run moves toward the left in Figure 1 and automatically takes the grids one by one from the stack. The grids so taken are protected, confined and controlled by the receivers or carriers 38 in which they drop, and remain in these carriers through their travel through the paste applying means wherein the paste is forced thereinto under the action of the screw 65. The operator may occasionally use the handle 55 by pulling it back a slight amount whereby to lift the hopper slightly and allow foreign particles of dry paste or other particles to come out from under the edge of the hopper. The operator can determine from the appearance of the ribbon of paste at any time when this needs to be done. This eliminates frequent jamming. The grids are also protected and confined during their travel under the wiping mechanism which functions to compact and smooth the paste and to remove any excess paste in the manner described above.

As pointed out hereinabove, the plates, when pasted and when being acted on by the wiping means W, travel along the smooth, flat or polished top or table 35. Hence, any tendency of the paste to stick or adhere to the support along which the panels or grids are traveling is avoided. After leaving the wiping mechanism W, the plates are carried to the ejecting mechanism and in one embodiment of the invention are taken from the ejecting mechanism by the transferring mechanism shown in Figures 18 to 20, inclusive, by which they are carried to the oven conveyor or any suitable take-off conveyor.

The transferring mechanism also acts to turn the pasted panels or grids up-side-down to so dispose the panels that they may be conveniently given a hand troweling or wiping on their undersides, that is, on the sides that have been traveling along the table whereby to remove any possible pulls or holes.

Where the supplemental wiping mechanism shown in Figure 21 is employed the necessity for manual troweling or manually wiping the undersides of the pasted grids or panels is avoided. It will be noted that the supplemental or auxiliary wiping mechanism W' is so designed that the plates are pushed through the stationary wipers in a direction opposite to that in which they have been traveling along the table or bed of the machine. Thus the stationary wipers of the supplemental wiping mechanism act on both faces or surfaces of the pasted grids or panels and further tend to counteract any pulling effect to which the pasted grids may have been subjected during the time they are acted upon by the main wiping mechanism W.

In the construction illustrated, the table has been shown as imperforate, flat and smooth throughout its extent. Obviously, it is not essential to have that portion of the table between the stack of grids and the pasting means so constituted. Such portion of the table may be of open structure, to permit any remaining particles of paste to drop through.

While embodiments of the invention have been shown and described for the sake of illustration, obviously various changes in the size, form, arrangement and construction of the parts may be resorted to without departing from the spirit of the invention and the scope of the subjoined claims.

The invention claimed is:

1. A pasting machine for applying paste to grids comprising an imperforate table, feeding means including carriers conforming in contour with and adapted to receive and advance grids along said table, means for applying paste to said grids while they are in said carriers and being advanced along said table, and means above the table for wiping pasted grids as they are advanced along said table and comprising a plurality of wiping elements supported for movement across and at an angle to said pasted grids, the line of movement of the wipers being at an angle to the line of movement of the grids and means for moving said wiping elements in the same general direction as said pasted grids but at a greater speed.

2. A pasting machine for applying paste to grids to form battery plates comprising a table, feeding means including carriers conforming in contour with and adapted to receive and advance grids along said table, means for applying paste to said grids while they are in said carriers and being advanced along said table, and means engageable with the underside of the grids for lifting a portion at least of said grids to a position above said carriers at the delivery end of the machine.

3. A pasting machine for applying paste to grids comprising an imperforate table, a conveyor for feeding the grids along the table, paste applying means for filling the spaces of the grids with paste and wiping means above the table comprising side frame members extending across the conveyor at an angle, a pair of endless sprocket chains mounted on said side frame members, means for moving said sprocket chains and wiper blades carried by the sprocket chains and moved thereby across the pasted grids.

4. In a machine for applying paste to grids, a main frame having a top, an endless feed conveyor for feeding the grids along said top, means for applying paste to the grids and consisting of a hopper supported above the table and having a discharge opening immediately above the grids, means for forcing the paste through said discharge opening and into the grids and including a feed screw supported for rotation within the hopper, means for rotating said feed screw and comprising a vertical shaft upon which said hopper is mounted for swinging movement, and spur gearing between said shaft and said feed screw.

5. In a machine for applying paste to grids, a main frame having a top, an endless feed conveyor for feeding the grids along said top, means for applying paste to the grids and consisting of a hopper supported above the table and having a discharge opening immediately above the grids, means for forcing the paste through said discharge opening and into the grids and including a feed screw supported for rotation within the hopper, means for rotating said feed screw and comprising a vertical shaft upon which said hopper is mounted for swinging movement, gearing between said shaft and said feed screw, means for holding the hopper against swinging movement when it is in operative relation to the table, and means for elevating the hopper to disengage said securing means and to permit swinging thereof to one side of the table.

6. In a machine of the character described, wiping mechanism including a pair of side frame members, driving and idler shafts mounted on said members, sprocket wheels carried by said shafts, sprocket chains trained over said sprocket wheels, said members having tracks along certain of which certain runs of said sprocket chains ride, cross yokes connecting said chains, wiper blades connected to said cross yokes, and means cooperable with other of said tracks for preventing tilting of the yokes and blades during the wiping operation.

7. In a machine of the character described, wiping mechanism including a pair of side frame members, driving and idler shafts mounted on said members, sprocket wheels carried by said shafts, sprocket chains trained over said sprocket wheels, said members having tracks along which said sprocket chains ride, cross yokes connecting said chains, wiper blades connected to said cross yokes, and means for preventing tilting of the yokes and blades during the wiping operation and comprising holding strips connected to the yokes and guides coacting with said strips to constrain said wiper blade to proper movement and position when they are exerting a wiping action.

8. A pasting machine of the character described comprising a main frame having a top, an endless feed conveyor having grid carriers adapted to receive the grids and propel them along said table, means for delivering grids to said carriers, means for applying paste to the grids while they are in the carriers, means for wiping the pasted grids, means for lifting the grids from the carriers at the delivery end of the machine and including lifting fingers engageable with the grids and means actuated by the endless conveyor for operating said fingers at the proper time.

9. A pasting machine for applying paste to grids to form battery plates comprising a table, feeding means for advancing grids along said table, means for applying paste to said grids while they are being advanced along the table, and means for exerting a wiping action on said pasted grids at an angle to the line of movement thereof, the end of the table to which the wiping means completes its action being inclined along a line paralleling the line of action of the wiping means.

10. A pasting machine for applying paste to grids comprising a table, feeding means including carriers to receive and advance the grids along the table, means for applying paste to the grids while they are in said carriers and being advanced along the table, and yieldable means engageable with the underside of said grids for lifting a portion at least of said pasted grids to a position above said carriers at the delivery end of the machine.

11. A pasting machine of the character described comprising a table, an endless feed conveyor carrying grids along the table and consisting of endless chains and grid carriers connected to and moved with said chains, said chains having a run extending along the table, cooperating means between the chains and the table for holding the runs extending along the table top against upward movement, means for supplying grids to said carriers, and means positioned above the table for forcing paste down into the grids controlled by said carriers and moving along the top of the table.

JOHN S. COLDWELL.